United States Patent [19]

Harwath

[11] Patent Number: 4,958,997

[45] Date of Patent: Sep. 25, 1990

[54] TWO-STAGE GEAR PUMP WITH IMPROVED SPUR GEAR MOUNTING

[75] Inventor: Frank L. Harwath, Rockford, Ill.

[73] Assignee: Suntec Industries Incorporated, Rockford, Ill.

[21] Appl. No.: 413,121

[22] Filed: Sep. 27, 1989

[51] Int. Cl.[5] ............................ F04C 2/10; F16B 3/00
[52] U.S. Cl. .................................. 418/171; 403/354; 403/356
[58] Field of Search ............... 418/102, 170, 171, 182, 418/206; 403/354, 355, 37

[56] References Cited

U.S. PATENT DOCUMENTS 4,171,939 10/1979 Harwath ............... 418/170
4,685,871 8/1987 Harwath .............. 418/206 X
4,728,271 3/1988 Harwath .............. 418/206

FOREIGN PATENT DOCUMENTS 1553032 9/1969 Fed. Rep. of Germany ...... 418/171

Primary Examiner—John J. Vrablik
Assistant Examiner—David L. Cavanaugh
Attorney, Agent, or Firm—Leydig, Voit & Mayer, Ltd.

[57] ABSTRACT

A two-stage gear pump with two gear sets each having a spur gear telescoped onto a slotted drive shaft with a press fit and also positively keyed to the shaft. An annular groove is formed around the shaft adjacent the closed end of the slot in the shaft and enables the slot to be relatively short in axial length so as to reduce manufacturing problems and to enhance the press fit between the shaft and the first stage spur gear.

4 Claims, 1 Drawing Sheet

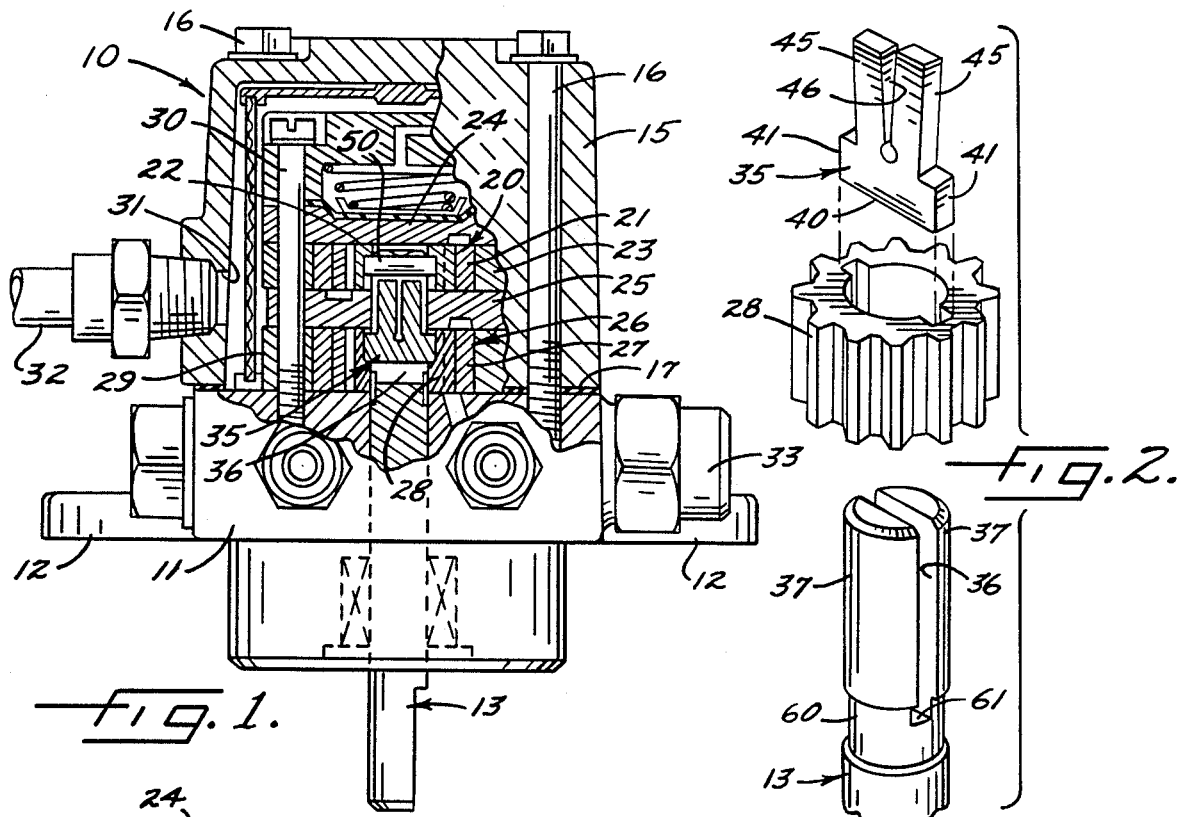
Fig. 1.
Fig. 2.
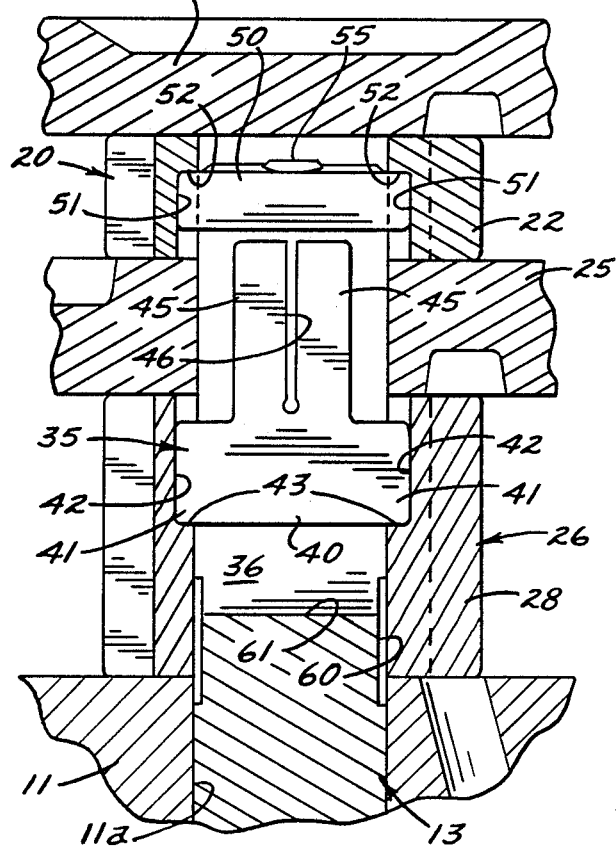
Fig. 3.
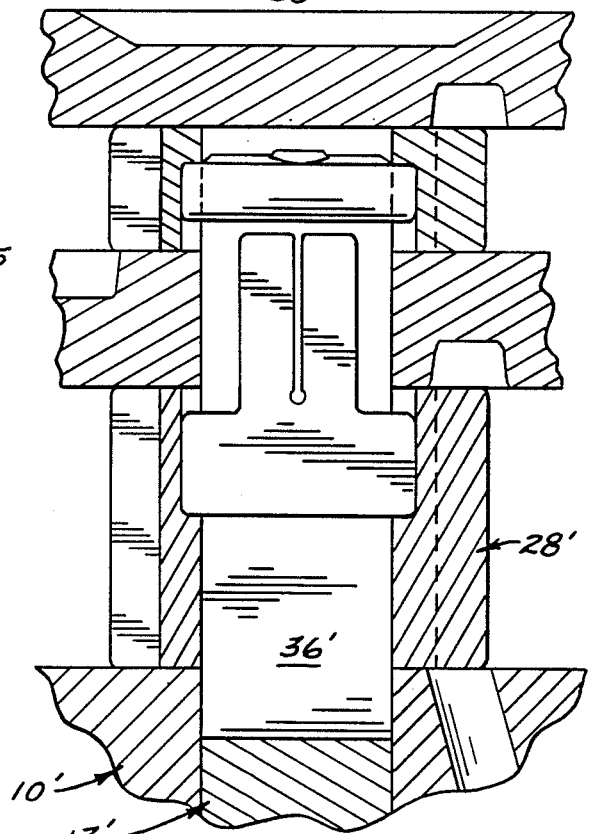
Fig. 4.
(PRIOR ART)

TWO-STAGE GEAR PUMP WITH IMPROVED SPUR GEAR MOUNTING

BACKGROUND OF THE INVENTION

This invention relates to a gear pump of the type which is especially adapted to supply pressurized liquid fuel to an oil burner. The invention more particularly relates to a two-stage gear pump.

In such a gear pump, each stage comprises a spur gear secured to a drive shaft and rotatable within a ring gear. It is conventional to couple the spur gears to the shaft both with a press fit and with positive-acting keys. The keys fit into a slot formed radially through the shaft and opening axially out of the free end thereof. The slot divides the free end portion of the shaft into two cantilevered halves which are stressed and flexed toward one another when the gears are pressed onto the shaft.

A gear pump of this general type is disclosed in Harwath U.S. Pat. No. 4,728,271. In prior gear pumps, it has been necessary to form a relatively long slot in the shaft in order to relieve stress on the second stage spur gear when that gear is pressed onto the shaft. When the second stage gear is comparatively thick in an axial direction, the axial length of the slot becomes so great as to create excessively long cantilevered shaft portions. This causes manufacturing difficulties and particularly when the shaft is finished by a centerless grinding operation. Moreover, the long cantilevered shaft portions become so flexible that it is difficult to establish a tight press fit between the shaft and the first stage spur gear.

SUMMARY OF THE INVENTION

The general aim of the present invention is to provide a new and improved gear pump of the above general type in which both spur gears may be pressed effectively onto a shaft having a slot which is significantly shorter than has been possible heretofore.

A more detailed object is to achieve the foregoing through the formation of an annular groove around the shaft adjacent the closed end of the slot. The groove allows the slot to be relatively short in length while still enabling the second stage spur gear to be pressed onto the shaft without being subjected to excessive stress.

The invention also resides in the unique location of the annular groove to establish a lubricating path between the shaft and the body of the pump.

These and other objects and advantages of the invention will become more apparent from the following detailed description when taken in conjunction with the accompanying drawings.

BRIEF DESCRIPTION OF THE DRAWINGS

FIG. 1 is a side elevational view of a new and improved gear pump incorporating the unique features of the present invention, certain parts of the pump being broken away and shown in section.

FIG. 2 is an exploded perspective view showing the shaft of the pump and showing one of the gears and keys adapted to be attached to the shaft.

FIG. 3 is an enlarged view of certain parts shown in FIG. 1.

FIG. 4 is a view similar to FIG. 3 but shows the corresponding parts of a conventional prior art pump.

DETAILED DESCRIPTION OF THE PREFERRED EMBODIMENT

For purposes of illustration, the invention has been shown in the drawings as embodied in a gear pump 10 of the type which is widely used for delivering fuel oil from a tank (not shown) and supplying the fuel under pressure to an oil burner (not shown). The constructional and operational features of the pump from a hydraulic standpoint are well known and need not be described in detail.

Briefly, the pump 10 includes a body comprising a first member 11 formed by a casting having ears 12 for mounting the pump. A drive shaft 13 extends through the casting 11 and is rotatably supported with a bore 11a in the casting. The outer end portion of the shaft projects outwardly from the outer end of the casting and is adapted to be connected to a drive motor (not shown).

Disposed in face-to-face relation with the other end of the casting 11 is a second member 15 which is generally in the form of a housing detachably secured to the casting 11 by screws 16. A gasket 17 establishes a fluid-tight seal at the interface of the casting 11 and the housing 15.

Located within the housing 15 is a first stage gear set 20 having a ring gear 21 and a spur gear 22 similar to the gears of the pump disclosed in Harwath U.S. Pat. No. 4,728,271, the spur gear being fixed to and rotatable with the free or inner end portion of the drive shaft 13. The ring gear is surrounded by a stationary spacer ring 23 which is sandwiched between an upper end plate 24 and a lower spacer plate 25.

A second stage gear set 26 is located within the housing 15 beneath the spacer plate 25 and includes a ring gear 27 which encircles a spur gear 28. The spur gear 28 is fixed to and is rotatable with the shaft 13 while the ring gear 27 is surrounded by a spacer ring 29 which is sandwiched between the casting 11 and the spacer plate 25. Screws 30 secure the end plate 24, the spacer ring 23, the spacer plate 25 and the spacer ring 29 to the casting 11.

When the drive shaft 13 is rotated, fuel from the tank is sucked into the pump 10 by the gear sets 20 and 26 via an inlet port 31 formed in the housing 15 and connected to a supply line 32. Pressurized fuel is delivered to the oil burner by way of an outlet or nozzle port 33 associated with the casting 11 and located on the side of the pump opposite the inlet port 31. The fuel is pressurized by virtue of the spur gears 22 and 28 rotating within the ring gears 21 and 27, respectively.

The pump 10 includes means for connecting each of the spur gears 22 and 28 to the drive shaft 13 both with a press fit and with a positive coupling in order to reduce wear that normally occurs at the drive interfaces between the gears and the shaft. Specifically, the aforementioned means comprise an axially elongated element or key 35 which fits in a slot 36 in the shaft 13 and which not only serves to positively couple the gear 28 to the shaft but preferably also to permit and enhance a press fit between the gear 22 and the shaft. As shown most clearly in FIG. 2, the slot 36 is rectangular in crosssection, is formed radially through the inner end portion of the shaft and opens axially out of the inner end of the shaft. The slot is of constant circumferential width throughout its length.

As a result of the slot 36, the inner end portion of the shaft 13 is divided into two cantilevered halves 37 (FIG.

2). The gear 28 is telescoped onto the shaft with a press fit and, because of the slot 36, the two cantilevered halves 37 of the shaft may yield radially to permit the gear to be pressed tightly onto the shaft without splitting the gear even though there is a wide range of tolerance variations between the shaft and the gear.

Torque normally is transmitted between the shaft 13 and the gear 28 by virtue of the press fit and thus there usually is no relative rotation between the gear and the shaft. The key 35, however, coacts between the shaft 13 and the gear 28 to transmit torque if the pump 10 should require torque beyond the capability of the press fit; as might occur, for example, during start-up and shutdown of the pump. For this purpose, the key 35 includes a flat tongue-like outer portion 40 disposed in the outer end portion of the slot 36 and further includes a pair of ear portions 41 projecting radially outwardly from the shaft 13. As shown in FIG. 2, the ears 41 extend into diametrically opposed slots or keyways 42 formed in the inner periphery of the gear 28. The keyways open axially out of the inner end of the gear 28 and terminate as axially inwardly facing shoulders 43 located near the outer end of the gear 28. The shoulders 43 engage the outer ends of the ears 41 and prevent the outer end of the key 35 from bottoming against the slot 36.

The inner end portion of the key 35 preferably is formed with two spring fingers 45 which bear against opposite sides of the slot 36 and spread the two cantilevered halves 37 of the shaft 13 away from one another to enable the gear 22 also to be telescoped onto the shaft with a tight press fit without splitting the gear. To these ends, the key 35 is made of resiliently yieldable steel and is formed with a slot 46 (FIG. 2) which extends from the extreme inner end of the key to a point just short of the ears 41. The slot 46 extends completely through the narrow dimension of the key 35 and causes the two cantilevered fingers 45 to be defined at the inner end portion of the key.

During formation of the key 35, one of the fingers 45 is sprung outwardly in one direction while the other finger is sprung outwardly in the opposite direction as shown in FIG. 2 so as to make the effective narrow dimension of the key slightly greater than the width of the slot 36. When the key is inserted into the slot 36, the fingers 45 are flexed inwardly and thereafter press resiliently against the sides of the slot 36 so as to spread the two shaft halves 37 away from one another. As a result of the slot 36 and the fingers 45, the shaft 13 may be compressed radially to allow the gear 22 to be pressed onto the shaft and thereafter the fingers urge the two halves 37 of the shaft outwardly against the inner periphery of the gear 22 to help insure a tight fit between the shaft and the gear. The fingers effect such a tight fit even though the nominal diameter of the shaft may have been reduced somewhat by virtue of the gear 28 having been pressed onto the shaft. It should be appreciated, however, that the slot 46 could be omitted and that the two fingers could be an integral piece.

The pump 10 further includes a square key 50 which extends radially through the slot 36 near the extreme inner end of the shaft 13. The key 50 fits within diametrically opposed keyways 51 (FIG. 3) in the inner periphery of the gear 22 and is trapped between the outer end of the key 35 and axially outwardly facing shoulders 52 defined at the inner ends of the keyways 52. In addition, the key is staked in place by a hot upset 55 which is formed by ramming an electrode downwardly against the center portion of the inner end of the shaft 13 to swage the metal adjacent the open end of the slot 36 over against the key 50. When the pump 10 is subjected to high torque, the key 50 augments the press fit between the shaft 13 and the pinion 22 and forms a positive coupling for carrying torque which is beyond the capability of the press fit.

The gears 22 and 28 are assembled with the shaft 13 by first pressing the gear 28 onto the inner end portion of the shaft while the key 35 is disposed inside of and is preassembled with the gear 28, the key 35 thus entering the slot 36 in the shaft. Thereafter, the hot upset 55 is formed on the end of the shaft. After the spacer plate 25 has been slipped over the shaft, the square key 50 is installed in the space between the spacer plate and the upset 55. Finally, the gear 22 is pressed onto the shaft to complete the assembly.

In accordance with the present invention, the axial length of the slot 36 is reduced significantly by forming an annular groove 60 (FIGS. 2 and 3) around the outer periphery of the shaft 13 adjacent the closed end 61 of the slot. As shown in FIG. 3, one portion of the groove 60 is located inside of the gear 28 and extends inwardly along the shaft beyond the closed end 61 of the slot 36. The remaining portion of the groove 60 is located in the bore 11a of the casting 11 and extends outwardly along the shaft from the closed end of the slot.

With the foregoing arrangement, the groove 60 reduces stress imposed on the gear 28 when the latter is pressed onto the shaft 13 since the press fit occurs only at those portions of the gear located inwardly of the groove. With the stress being relieved by the groove, it is not necessary to make the slot 36 so long as was required previously in order to avoid splitting the gear. A conventional prior art pump 10' without an annular groove in the shaft 13' is shown in FIG. 4. In such a pump where the gear 28' has an axial thickness of 0.500", it is necessary to provide a slot 36' having an axial length of 0.936" in order to avoid splitting the gear. By virtue of the stress relief provided by the groove 60 of the present pump 10, the same gear 28 with the same 0.500" axial thickness may be effectively pressed onto a shaft 13 having a slot 36 with a length of only 0.737".

By virtue of the slot 36 of the present pump 10 being significantly shorter, the cantilevered shaft halves 37 are shorter and less flexible. As a result, less distortion and chattering of the shaft occurs during a centerless grinding operation and thus manufacturing difficulties are reduced. Moreover, the shorter shaft halves 37 enable a tighter press fit to be achieved between the shaft and the first stage gear 22. This is a secondary advantage, however, since in some cases a tight press fit may not be required and indeed the drive might be established entirely through the key 50.

Because the groove 60 extends into the bore 11a in the casting 11, a path is established for fuel oil in the slot 36 to flow between the shaft and the casting for lubricating purposes. Thus, adequate lubrication is maintained even though the slot 36 terminates short of the bore.

I claim:

1. A gear pump comprising a body, an elongated shaft rotatably supported by said body and having an axially facing free end, a gear telescoped onto the free end portion of said shaft with a press fit, a slot formed radially through the free end portion of said shaft and opening axially out of the free end of said shaft, said slot extending along said shaft at least to a point within said gear and terminating in a closed end, said slot dividing the free end portion of said shaft into two cantilevered halves, a key disposed within said slot and having means engageable with said gear to positively couple said gear and said shaft for rotation in unison, and an annular groove formed circumferentially around the outer periphery of said shaft at the closed end of said slot to reduce stress on said two cantilevered halves of said shaft, the closed end of said slot being located between the ends of said groove.

2. A gear pump as defined in claim 1 in which the closed end of said slot is located inside of said gear, said groove having a first portion located inside of said gear and on one side of the closed end of said slot and having a second portion located outside of said gear and on the opposite side of the closed end of said slot.

3. A gear pump as defined in claim 2 in which said second portion of said groove is located inside of said body.

4. A gear pump comprising a body, an elongated shaft rotatably supported by said body and having an axially facing free end, first and second axially spaced gears pressed tightly onto and rotatable with the free end portion of said shaft, said first gear being located further away from the free end of said shaft than said second gear, a radially and axially opening slot formed through the free end portion of said shaft and terminating in a closed end located within said first gear, said slot dividing the free end portion of said shaft into two cantilevered halves, first and second keys disposed in said slot and engageable with said first and second gears, respectively, to positively couple said gears and said shaft for rotation in unison, and an annular groove formed circumferentially around said shaft, said groove having a portion located inside of said first gear and on one side of the closed end of said slot and having a portion located outside of said first gear and on the opposite side of the closed end of said slot, whereby the closed end of said slot is located between the ends of said groove.

* * * * *